Dec. 17, 1963 V. R. OLSEN 3,114,186
ADJUSTABLE DRAPERY HOOK
Filed Aug. 25, 1960

INVENTOR
VERNON R. OLSEN
BY Price and Heneveld
ATTORNEYS

United States Patent Office 3,114,186
Patented Dec. 17, 1963

3,114,186
ADJUSTABLE DRAPERY HOOK
Vernon R. Olsen, Grand Rapids, Mich., assignor to Electricam Corporation, Grand Rapids, Mich., a corporation of Michigan
Filed Aug. 25, 1960, Ser. No. 51,821
1 Claim. (Cl. 24—84)

This invention relates to adjustable drapery hooks, and more particularly to the type in which a hook member is slidably mounted in a notched guide member.

A large variety of adjustable drapery hooks have been proposed in the past, but they have all had the disadvantage of being either cumbersome, complicated, or otherwise expensive to manufacture, or else they required deleterious bending of the material of the hook itself.

The present invention overcomes these disadvantages by providing a hook member slidably received in a guide member and having end portions received in notches of the guide member to allow adjustment of the hook member. The base plate of the guide member at the same time serves as a part of the clip structure by which the hook is attached to the drapery.

It is the object of this invention to provide an adjustable drapery hook which is adjustable in small increments over a wide range without requiring undue deformation of any portion of the assembly.

It is a further object of this invention to provide an adjustable drapery hook which is sturdy and inexpensive to manufacture.

These and other advantages of the present invention will be apparent from the following specification taken in connection with the accompanying drawing in which.

Figure 1:
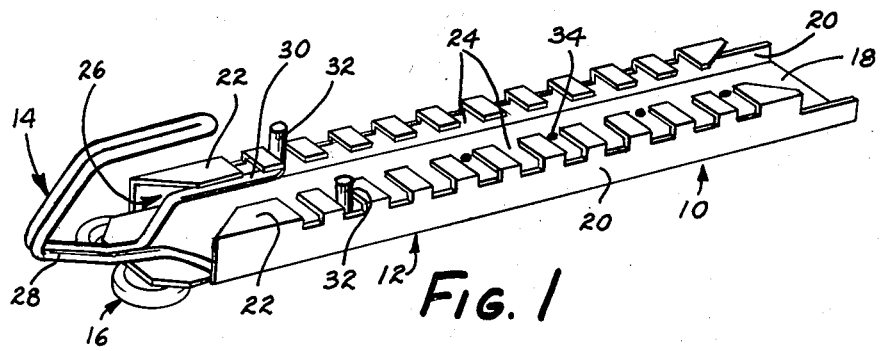
FIG. 1 is a perspective view of the drapery hook assembly of this invention.

Basically, the drapery hook assembly of this invention consists of a drapery-engaging clip formed by a pair of resilient clip wires and the base plate of a guide member. The base plate of the guide member is provided with lateral upstanding flanges, which in turn terminate in inturned flanges, the latter being notched at frequent intervals to receive the upstanding end portions of the hook member. The base plate, upstanding flange and inturned flange on each side of the base plate provide a guide channel in which the resilient legs of the hook member are slidably received. Appropriate markings may be affixed to the base plate opposite those notches in which the end portions of the hook member must be placed in order to give the adjustable hook assembly a length corresponding to the various standard sizes of non-adjustable hooks on the market.

Referring now to the drawings, the assembly of my invention is generally shown at 10. It consists basically of a guide member 12, a hook member 14, and a clip 16. The guide member 12 consists of a base plate 18 made of a flat, rigid material. The base plate 18 has formed on each side thereof an upstanding flange 20, which inturned has an inturned flange 22 extending inwardly from the upper end thereof. The inturned flanges 22 are provided with a series of notches 24. The base plate 18, upstanding flanges 20, and inturned flanges 22 together constitute a pair of guide channels 26 extending longitudinally along the sides of base plate 18.

The hook member 14 has a hook portion 28 adapted to hook over a drapery rod (not shown). The hook portion 28 terminates in a pair of spaced leg portions 30, each of which terminates in an upstanding end portion 32. The leg portions 30 are resiliently urged against the upstanding flanges 20 of the guide member 12.

By the same token, the resiliency of the leg portions 30 urges the end portions 32 into the notches 24. Markings 34 may be provided in the base plate to indicate those notches into which the end portions 32 have to be placed in order to make the assembly 10 of various standard lengths.

Figure 2:
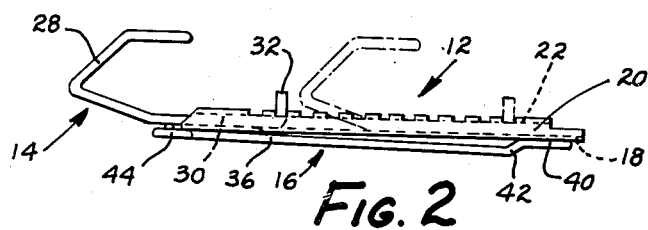
FIG. 2 is a side elevation of the assembly of FIG. 1, showing in full lines the hook position corresponding to a low position of the drapery, and in dotted lines the hook position corresponding to the highest position of the drapery.
Figure 3:
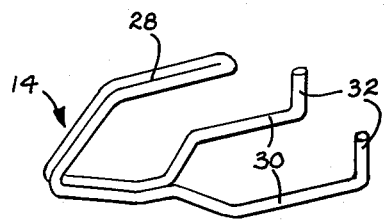
FIG. 3 is a perspective view of the hook member.
Figure 4:
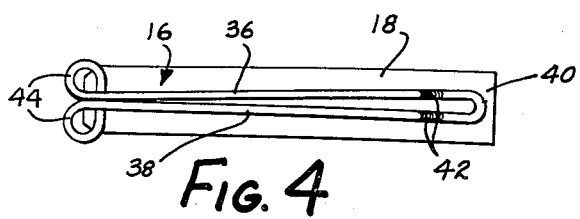
FIG. 4 is a bottom view of the assembly of FIG. 1 with the hook member removed.

Referring now more particularly to FIGS. 2 and 4, it will be seen that the clip 16 consists of a pair of clip wires 36, 38 made of a resilient material and welded or otherwise attached to the base plate 18 at 40. The clip wires 36, 38 are spaced from the base plate 18 at 42 for a purpose hereinafter described. Each of the clip wires 36, 38 terminates in an ear 44.

In operation, the ears 44 of the clip wires are inserted into the drapery on each side of a fold in a manner well-known to those skilled in the art. In this condition, the fold of the drapery is caught between the wires 36 and 38, and the flat portion of the drapery is caught between the base plate 18 and the clip wires 36 and 38 respectively. With the drapery thus inserted, the clip wires 36, 38 become substantially paralleled to the base plate 18, and the drapery material occupies the space between them and base plate 18 down to the offset 42 which serves as a stop for the insertion of the drapery. The length of the hook assembly can now be easily adjusted by grasping the end portions 32 and pushing them toward each other. When the end portions 32 clear the notches 24, the hook member 14 can be moved back and forth in the guide channels 26. In order to secure the hook member 14 at a given point, it is only necessary to release the end portions 32 and to let them snap into a desired pair of notches 24.

It will be noted that the arrangement of this invention permits considerable loading of the drapery hook assembly, because the sides of the notches 24 are normal to the direction of movement of the hook member 14, so that there is no danger of the end portions 32 slipping out of the notches 24 when a heavy load is applied to the drapery hook assembly 10. Obviously, many modifications of this invention are possible without departing from the spirit thereof, and the embodiment shown in the drawing is illustrative only. I therefore do not desire to be limited by the foregoing description, but only by the scope of following claim.

I claim:

An adjustable drapery hook comprising a clip member having a pair of arms resiliently biased toward each other; a guide member fixed to said clip member, said guide member having a base plate cooperating with said clip member to hold a drape therebetween; said arms being resiliently biased against said base plate; a hook member having a pair of spaced resilient leg portions, said leg portions each having an upstanding end portion protruding beyond the plane defined by said leg portions; means for slidably supporting said leg portions adjacent said base plate; and means on said base plate for preventing sliding movement of said leg portions.

References Cited in the file of this patent

UNITED STATES PATENTS

| | | |
|---|---|---|
| 540,274 | Schöne | June 4, 1895 |
| 1,787,202 | Kendall | Dec. 30, 1930 |
| 1,983,467 | Klüglein | Dec. 4, 1934 |
| 2,592,478 | Sherman | Apr. 8, 1952 |
| 2,685,113 | Roeckel | Aug. 3, 1954 |
| 2,897,558 | Ronci | Aug. 4, 1959 |

FOREIGN PATENTS

| | | |
|---|---|---|
| 173,666 | Austria | Jan. 10, 1953 |
| 717,256 | Great Britain | Oct. 27, 1954 |